Figure 1:
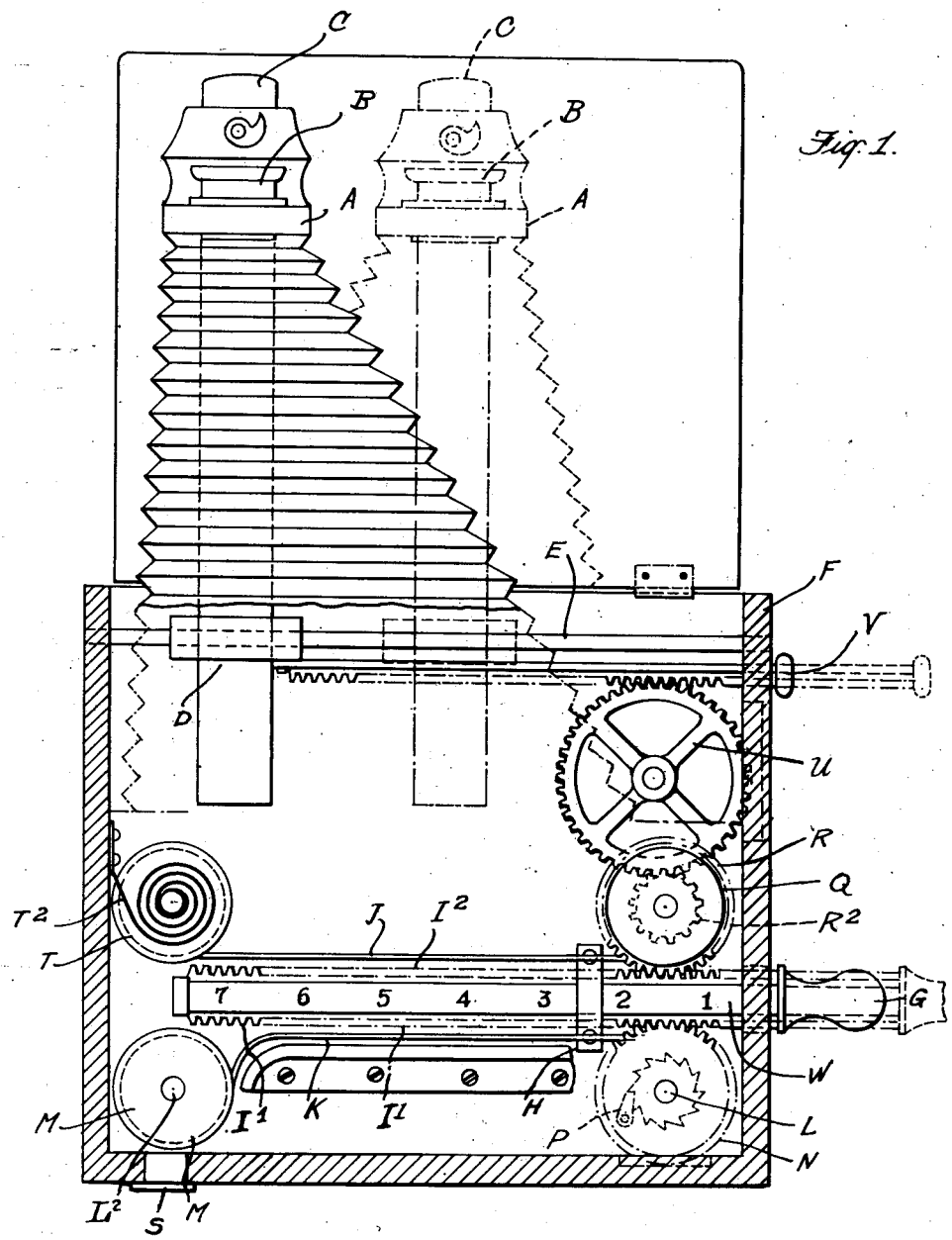

March 1, 1932.                C. H. KESSES                1,847,531
                               FILM CAMERA
                            Filed Jan. 7, 1926            2 Sheets-Sheet 1

INVENTOR
Charles H. Kesses.

March 1, 1932.  C. H. KESSES  1,847,531
FILM CAMERA
Filed Jan. 7, 1926  2 Sheets-Sheet 2
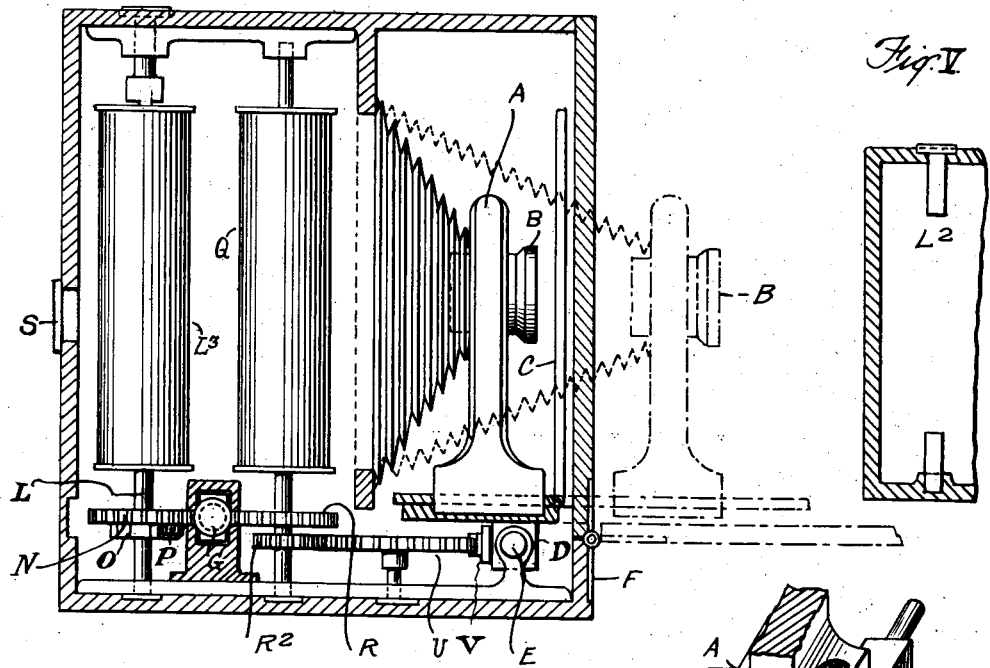
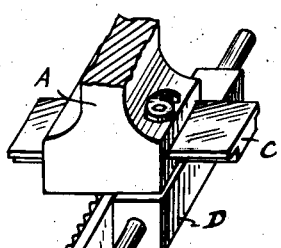
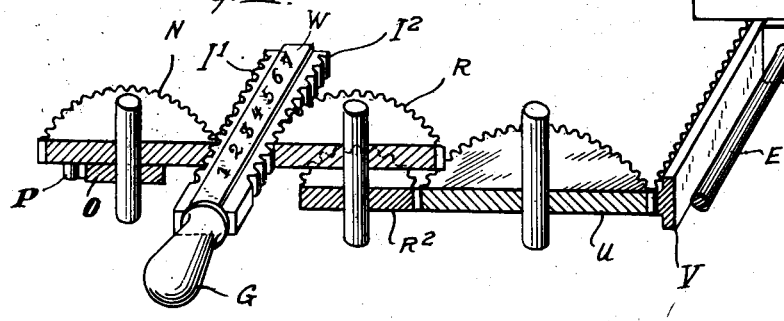
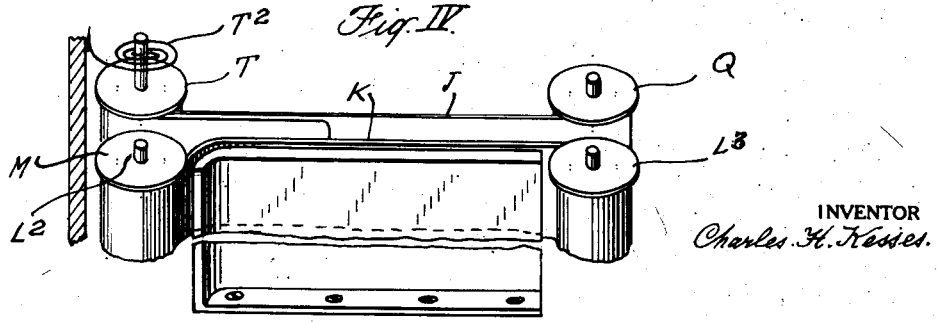
INVENTOR
Charles H. Kesses.

Patented Mar. 1, 1932

1,847,531

UNITED STATES PATENT OFFICE

CHARLES H. KESSES, OF NEW YORK, N. Y.

FILM CAMERA

Application filed January 7, 1926. Serial No. 79,757.

My invention relates to film, shutter and lens movements in cameras and the objects of my inventions are;

First; to provide means to expose different size pictures on one film strip.

Second; to provide means to expose a few large pictures or a great number of small pictures on the same length of film strip.

Third; to have means provided to make the camera ready for the exposure of any size picture by pulling a sliding controlling member once.

Fourth; to have a scale secured on said controlling member for regulating the size of the pictures.

Fifth; to have means provided to move the lens through the movement of said controlling member in the centre of that part of the film which corresponds to the size of the picture required.

Sixth; to have a curtain shutter operatively connected to said controlling member, to open said shutter by the outward pulling of said member for the distance required to correspond to the size of the picture.

I attain these objects by the mechanism illustrated in the accompanying drawings in which—

Fig. I is a top view of the camera as it appears after the removal of the upper part of the camera body.

Fig. II is a vertical section of the camera on the line 1—2.

Fig. III is a detail view in perspective and partly sectional of the mechanical parts for the advancing of the filmstrip, the curtain slide and the lens.

Fig. IV is a detail perspective view of the upper parts of the film and the curtain slide.

Fig. V is a vertical section of a part of the camera, arranged for holding the new film spool.

Similar letters refer to similar parts throughout the several views.

A lensboard A carrying a lens B is arranged for sliding on a lenstrack C. A suitable bellows is secured to said lensboard its other end in the camera body F. A shaft E is with suitable brackets secured to both sides of the front part of said camera body and positioned to be parallel to the direction with the plane of the optical field. A sliding member D is provided with a fitted opening for holding said shaft E, to provide means to move said member with the lens B from one side of the camera to the other side. The lenstrack C is secured to the member D in such a position to be in a parallel direction to the optical axis of the lens B.

A straight controlling member G is provided to operate the mechanical parts of the camera. Said member is positioned to be in a parallel direction to the optical field. Racks $I^1$ and $I^2$ are secured on the side parts of said member. Said member is slidably arranged in a bracket H and in an opening in the side wall of the camera body F in such a manner that the racks $I^1$ and $I^2$ do not interfere with the out or inward movement of said controlling member. The rack $I^2$ is provided to operate a curtain slide J and the rack $I^1$ for the advancing of the film strip K.

Short shafts L are fitted in bearings, one in the top and one in the bottom of the camera body F. Said shafts are arranged for inserting the empty film spool $L^3$. Short shafts $L^2$ for holding the spool M with the film strip K are arranged in the same manner, and positioned at the lower end of said camera body. An idle gear N is arranged on the shaft L and meshed to the rack $I^1$. A ratchet wheel O is secured to said shaft and a pawl P is secured to said idle gear in such a position to engage said ratchet wheel to wind up the film K on the spool $L^3$ by the outward pulling of the controlling member G and not to move said film by the return movement of said member.

The curtain slide J is positioned in front of the film advancing mechanism A curtain roller Q is with its shaft in suitable bearings secured in the top and in the bottom of the camera body F. A gear wheel R which must be the same size as the idle gear N is secured to said shaft. Said gear R is meshed to the rack $I^2$ and arranged to move the curtain slide J through the movement of the controlling member G at the same quickness as the film K. A curtain slide roller T is at the lower end positioned in the camera body F. The length of the curtain J must be twice the length as the distance between the rollers Q and T. Said curtain is secured to the roller Q and its open ends to the roller T. The size of the opening in the curtain must correspond to the size of the largest picture to be taken with the camera. One end of a spiral spring $T^2$ is secured on the roller T its other end to the camera body F and arranged in such a manner to rewind that part of the curtain upon the return movement of the controlling member G.

To move the lens B through the outward pulling of the controlling member G in the centre of the size of picture to be exposed and to return said lens to its first position upon the return movement of said member, for this purpose is a gear wheel $R^2$ secured to the roller shaft Q. Said gear wheel must be half the size of the circumference of the gear wheel R. A gear wheel U which is meshed to the gear wheel $R^2$ is with its shaft in suitable bearings arranged in the bottom of the camera body F. A rack V which is meshed to the gear wheel U is secured to the sliding member D and positioned in a parallel direction to the shaft E its other end is slidably arranged in the side wall of the camera body F, to provide means to move the lens B at half the speed and in the same direction as the sensitive film K and the curtain J, thereby moving the opening in said curtain by the outward pulling of the controlling member G in front of that part of said sensitive film to be exposed and the lens in the centre of said part, after the exposure moves the controlling member inward to close said opening and to return the lens to its first position to be ready for the next operation.

An opening S which is covered with red transparent material is provided in the rear wall of the camera body F and positioned next to the film spool M, arranged for the purpose to trace the marking of the film backing paper.

A scale W is secured to the upper part of the controlling member G, for the purpose to pull said member according to the size of the picture required. The small unexposed space between the successive pictures will enlarge a minimum by each turn of the roller $L^3$, on account of the increasing diameter of said take up spool, therefore it is advisable to use a take up spool with a large diameter.

The co-operation of the several parts throughout a complete cycle of movements involved in the operation of the camera for the exposure of any size picture on a strip of sensitive film, place a new film spool M between the shafts $L^2$ and secure the film backing paper in a suitable manner to the empty spool $L^3$ carried by the shafts L, move the controlling member G out and inward till the marking on the film-backing paper shows the beginning of the film K, can be seen through an opening S, then the camera is ready for the operation, to expose a picture, pull the controlling member G according to the scale W to the position for the size of the picture required, thereby moving the film K through the movement of the rack $I^1$ and the gear wheel N, second; to open the curtain J through the movement of the rack $I^2$ and the gear wheel R, third; to move the lens through the movement of the rack V, the gear wheels R, $R^2$, U and the rack $I^2$ one half the distance as said film and said curtain for positioning said lens in the centre of that part of said film to be exposed, after the exposure push said controlling member inward thereby returning said lens and said curtain roller T to its first position and the curtain is rewound with the spiral spring $T^2$ on the roller T to be ready for the next operation.

I am aware that prior to my invention film cameras for one size of pictures were made, whereby a screw for turning was provided to advance the next part of the film for the same size of picture, but I never saw a film camera whereby different sizes of pictures on a strip of sensitive film can be exposed just by pulling once a straight controlling member for the distance which corresponds to the length of the picture required.

What I claim as my invention and desire to secure by Letters Patent is:

1. In a camera having a lens, a carrier for said lens, holders for a strip of sensitive material, a light excluding curtain provided with an opening for opening and closing said curtain, a controlling member mounted for outward sliding movement, means for sliding said member in a direction parallel to the focal plane of the camera and connections between said member, said holders, rollers and lens carrier whereby the outward sliding of said member will operate the holders to advance said material, will open said curtain and will move said lens at half the speed and in the same direction as said material by the outward pulling of said member and the return sliding of said member will return said lens to its first position and close said curtain.

2. In a camera having a lens, a carrier for said lens, holders for a strip of sensitive material, a light excluding curtain provided with an opening; rollers for opening and for closing said curtain, a controlling member mounted for outward sliding movement, means for sliding said member in a direction parallel to the focal plane of the camera, connections between said member and said holders, rollers and lens carrier whereby the outward sliding of said member will operate the holders to advance said sensitive material, will open said curtain and will move said lens at half the speed and in the same direction for positioning said lens in the center of that part of said advanced material for the full size picture or any part thereof and the return sliding of said member will return said lens to its first position and close said curtain.

Signed at New York city, in the county of New York and State of New York, this 5th day of January A. D. 1926.

CHARLES H. KESSES.